United States Patent
Isaacs

(10) Patent No.: US 7,255,564 B2
(45) Date of Patent: Aug. 14, 2007

(54) ANATOMICAL POCKET MODEL

(75) Inventor: Judah Isaacs, Far Rockaway, NY (US)

(73) Assignee: Innovative Premiums, Inc., Oceanside, NY (US)

( * ) Notice: Subject to any disclaimer, the term of this patent is extended or adjusted under 35 U.S.C. 154(b) by 462 days.

(21) Appl. No.: 10/389,054

(22) Filed: Mar. 14, 2003

(65) Prior Publication Data

US 2004/0180313 A1 Sep. 16, 2004

(51) Int. Cl.
*G09B 23/28* (2006.01)

(52) U.S. Cl. .................. 434/262; 434/267; 434/272; 434/81; 434/82; 40/538; 40/524

(58) Field of Classification Search .......... 434/262, 434/267, 272, 81, 82; 40/538, 524
See application file for complete search history.

(56) References Cited

U.S. PATENT DOCUMENTS

| | | | |
|---|---|---|---|
| 1,951,422 A * | 3/1934 | Klemperer | 434/270 |
| D106,450 S | 7/1937 | Matheson | |
| D158,662 S | 5/1950 | Hendrickson | |
| D159,446 S | 7/1950 | Riley | |
| 3,440,750 A | 4/1969 | Toth et al. | |
| 4,226,902 A * | 10/1980 | Webb | 428/7 |
| 4,323,350 A * | 4/1982 | Bowden, Jr. | 434/269 |
| 4,422,852 A * | 12/1983 | Mathias | 434/178 |
| 4,624,642 A | 11/1986 | Ferrara | |
| 4,702,701 A * | 10/1987 | Glover et al. | 434/270 |
| 4,802,858 A | 2/1989 | Lindskog et al. | |
| 4,819,963 A * | 4/1989 | Wolski | 281/15.1 |
| 4,841,651 A * | 6/1989 | Conner | 40/800 |
| 4,869,531 A * | 9/1989 | Rees | 283/67 |
| 4,941,276 A * | 7/1990 | Kanner | 40/538 |
| 4,951,404 A * | 8/1990 | Lithwick | 40/124.06 |
| 5,009,626 A * | 4/1991 | Katz | 446/391 |
| 5,112,228 A * | 5/1992 | Zouras | 434/272 |
| 5,196,242 A * | 3/1993 | Vicino | 428/12 |
| 5,244,394 A * | 9/1993 | Serabian-Musto | 434/263 |
| D359,255 S | 6/1995 | Williams | |
| 5,505,623 A * | 4/1996 | Chernack et al. | 434/272 |
| 5,518,407 A * | 5/1996 | Greenfield et al. | 434/272 |
| 5,607,311 A | 3/1997 | Brown-Wilkinson | |
| 5,636,873 A * | 6/1997 | Sonsteby | 283/81 |
| 5,657,562 A * | 8/1997 | Desormeaux | 40/124.01 |
| 5,672,059 A | 9/1997 | Brown-Wilkinson | |
| 5,720,502 A * | 2/1998 | Cain | 283/115 |
| D394,672 S * | 5/1998 | Allen et al. | D19/29 |
| 5,887,906 A * | 3/1999 | Sultan | 283/94 |
| 5,915,729 A * | 6/1999 | Vap | 281/22 |
| 5,951,301 A * | 9/1999 | Younker | 434/272 |
| 5,997,307 A * | 12/1999 | LeJeune, Jr. | 434/262 |
| 6,023,872 A * | 2/2000 | Falkenstein, Sr. | 40/800 |
| D422,315 S * | 4/2000 | Bosack | D20/11 |
| 6,113,395 A * | 9/2000 | Hon | 434/262 |

(Continued)

*Primary Examiner*—Eugene Kim
*Assistant Examiner*—Dolores R. Collins
(74) *Attorney, Agent, or Firm*—Katten Muchin Rosenman LLP

(57) ABSTRACT

An anatomical pocket model adapted for transporting in one's pocket or the like comprises a flexible, bendable, framework and a flexible, bendable three-dimensional representation of an anatomical body part positioned thereon. The anatomical body part representation is proportionate in size to a real life anatomical body part and facilitates a hands-on educational and demonstrational environment for both doctor and patient.

21 Claims, 4 Drawing Sheets

U.S. PATENT DOCUMENTS

| | | | |
|---|---|---|---|
| 6,132,218 A * | 10/2000 | Benja-Athon | 434/267 |
| D434,997 S * | 12/2000 | Wright et al. | D11/134 |
| 6,224,106 B1 * | 5/2001 | Murphy | 281/15.1 |
| D450,763 S * | 11/2001 | Fernandes et al. | D19/26 |
| 6,336,812 B1 * | 1/2002 | Cooper et al. | 434/267 |
| 6,383,135 B1 * | 5/2002 | Chikovani et al. | 600/300 |
| 6,517,407 B1 * | 2/2003 | Peters | 446/147 |
| 6,575,803 B1 * | 6/2003 | Liu | 446/147 |
| 6,638,073 B1 * | 10/2003 | Kazimirov et al. | 434/272 |
| 6,908,309 B2 * | 6/2005 | Gil et al. | 434/267 |
| 2002/0043764 A1 * | 4/2002 | Imhof | 273/292 |
| 2005/0202381 A1 * | 9/2005 | Keegan | 434/262 |

* cited by examiner

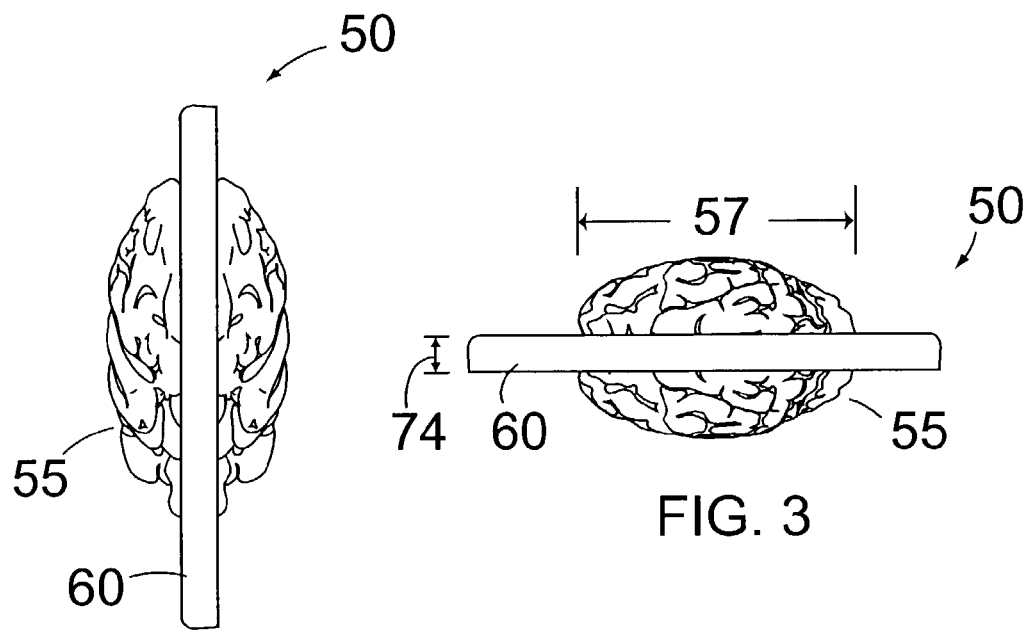
FIG. 4
FIG. 3
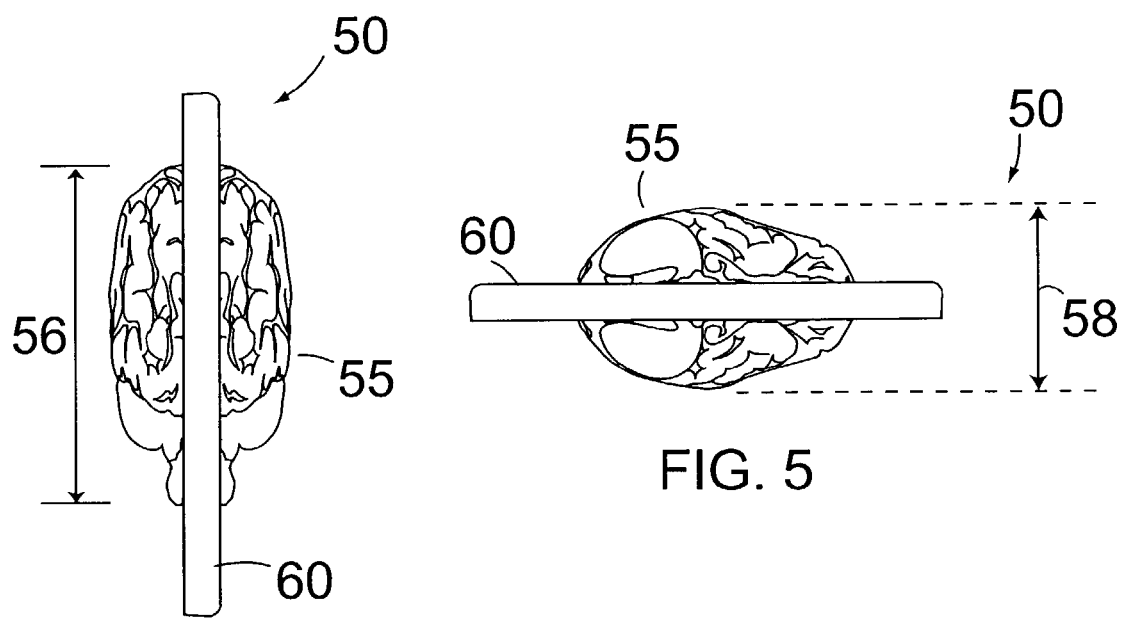
FIG. 6
FIG. 5

ANATOMICAL POCKET MODEL

FIELD OF THE INVENTION

The present invention relates to anatomical models in general, and more specifically to portable, transportable pocket anatomical models used to demonstrate anatomical body parts and conditions.

BACKGROUND OF THE INVENTION

Anatomical models are usually used in laboratory or teaching environments and tend to be representative of the actual body parts being displayed. Thus, an anatomical model of a skeleton might average five-to-six feet tall and one-to-two feet wide. Similarly, an anatomical model of a human lung might average six-to-twelve inches long and three-to-eight inches wide. Models having these types of dimensions are satisfactory as educational guides if they are stationary and/or housed in a dedicated location. However, using such models in a mobile environment can be somewhat challenging.

For example, a doctor seeing a plurality of patients that suffer from stomach ulcers might wish to illustrate a particular ulcer pathology to such patients. Currently, the doctor must carry a medical text illustrating such condition that can be quite heavy and cumbersome. Alternatively, the doctor might refer to an illustrated card showing the condition. However, such two-dimensional representations fail to realistically depict a stomach with a condition that the patients can touch, feel, manipulate and understand. Patients that are not provided with a means for a hands-on demonstration tend to feel removed from the doctor's explanation and are therefore less likely to appreciate the nature of their condition.

Thus, the present inventor has devised a pocket-sized, three-dimensional anatomical model that is easily stored and transported in a doctor's pocket. The anatomical model of the invention is proportionately sized relative to an actual anatomical body part, and thus provides a doctor with the ability to demonstrate the patient's condition using a three-dimensional representation that the patient can touch and understand. The pocket model of the present invention is also flexible and bendable for durability and so that it can be manipulated and transported without causing injury to the person storing it in one's pocket or the like.

SUMMARY OF THE INVENTION

An anatomical pocket model adapted for transporting in one's pocket comprises a flexible, bendable, framework and a flexible, bendable three-dimensional representation of an anatomical body part positioned thereon. The anatomical body part representation is proportionate in size to a real life anatomical body part in the length and width dimensions, but is disproportionate in size in the thickness dimension for storing in compact environments.

The anatomical pocket models of the invention are specifically designed for medical professionals to carry in the pocket of a typical lab coat. This greatly increases the usability and functionality of the models compared to the typical desktop-style anatomical models which are difficult and cumbersome to carry to patients' exam and/or treatment rooms or to other medical practitioners' offices. They can be used to illustrate for patients or colleagues various features of an organ or other body part under discussion as well as the locations of various pathologies as well as blockages, ruptures or other abnormalities. The anatomical pocket models themselves may or may not specifically illustrate these abnormalities. If such abnormalities are present, they may or may not be included as separate, removable parts of the model.

BRIEF DESCRIPTION OF THE DRAWINGS

FIGS. 3 and 4 are side views of the model of FIG. 1.
FIG. 5 is a top view of the model of FIG. 1.
FIG. 6 is a bottom view of the model of FIG. 1.

DETAILED DESCRIPTION OF THE PREFERRED EMBODIMENTS

Figure 1:
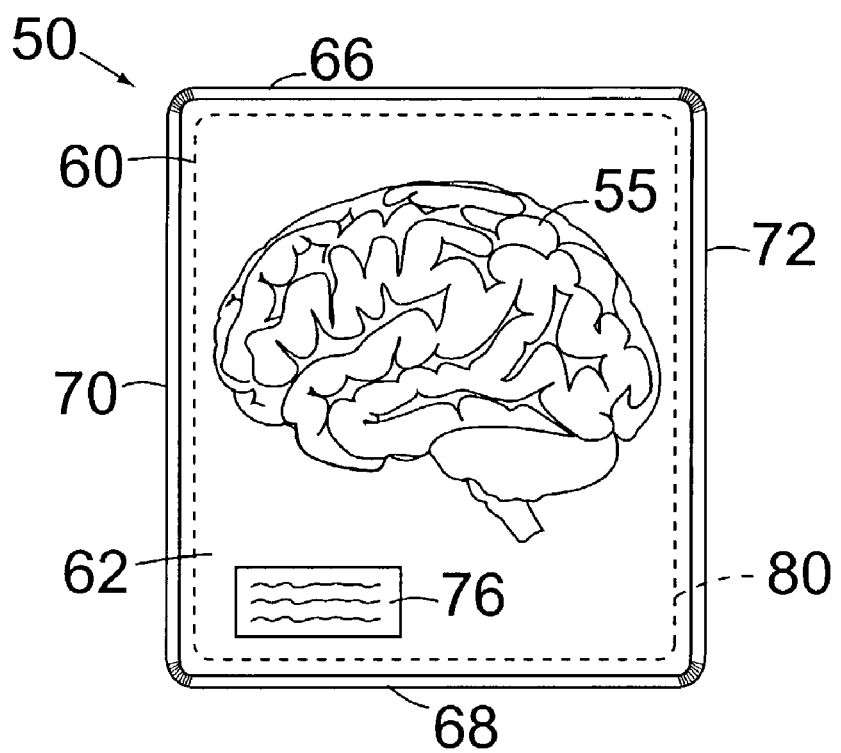
FIG. 1 is a front view of one embodiment of an anatomical pocket model of the present invention.
Figure 2:
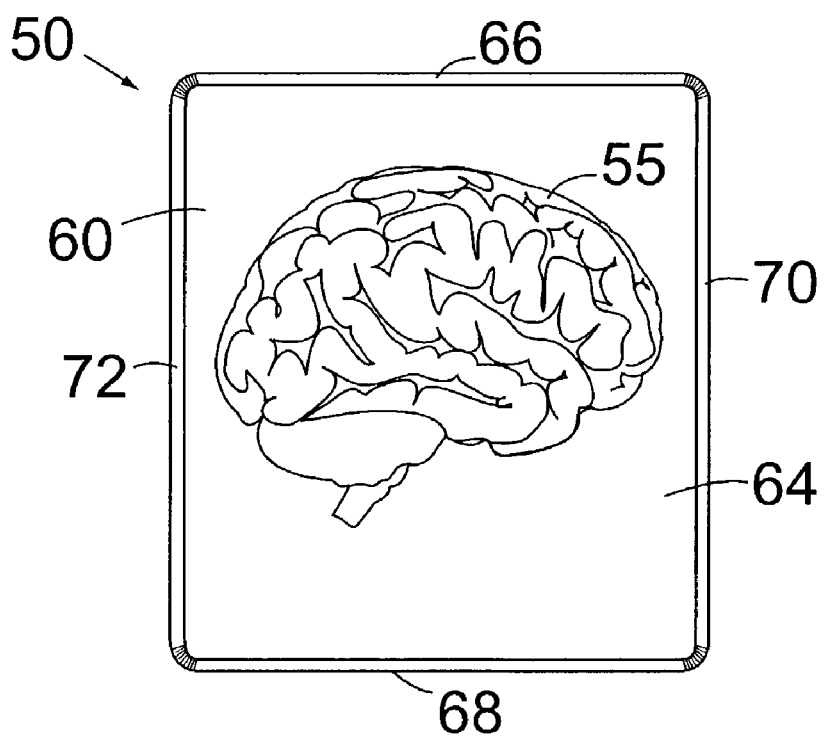
FIG. 2 is a back view of the model of FIG. 1.

The following detailed description is of the best mode or modes of the invention presently contemplated. Such description is not intended to be understood in a limiting sense, but to be an example of the invention presented solely for illustration thereof, and by reference to which in connection with the following description and the accompanying drawings one skilled in the art may be advised of the advantages and construction of the invention. In the various views of the drawings, like reference characters designate like or similar parts.

FIGS. 1-6 illustrate one embodiment of an anatomical pocket model 50 in accordance with the present invention. For purposes of explanation, the model 50 comprises a three-dimensional representation of a human brain 55, it being understood that other anatomy, human or otherwise, may be represented as desired (see FIGS. 7-10). For instance, if the model 50 is used by a veterinarian, then animal anatomy would be represented instead of human anatomy. Similarly, multiple anatomical structures, such as a plurality of skeletal vertebrae, can be demonstrated on the same model.

The model 50 comprises a flexible framework 60 that is bendable and preferably made from plastic or the like, said framework 60 having a front 62, back 64, top 66, bottom 68, left side 70, right side 72 and thickness 74. Identifying indicia 76 may be provided on a portion of the flexible framework 60 that is descriptive of the anatomical body part represented thereby. Identifying indicia 76 may also be provided on the anatomical representation 55 as desired, and/or used for marketing purposes on the model 50 in general. In the embodiment of FIGS. 1-6, the framework 60 is rectangular and encloses the three-dimensional anatomical representation 55 on all sides 66, 68, 70 and 72. The framework 60 may be other shapes as desired.

The anatomical representation 55 may be molded with the framework 60 in a one-step injection-molding process, or it may separately attached or adhered to the framework 60 in a multi-step process. If molded in a one-step process, the anatomical representation 55 would preferably be irremovable from the flexible framework 60. However, the model 50 may be manufactured so that the anatomical representation 55 is removable from the flexible framework 60, and possibly interchangeable with other anatomical representations as desired. Other methods of manufacturing the model 50 of the invention are contemplated. Regardless of how the model 50 is manufactured, it should preferably be constructed from a flexible material that will not injure or cause great discomfort to the medical professional or patient if he or she should bump into or lean against a rigid surface while carrying the model 50 in his or her pocket.

The three-dimensional anatomical representation 55 has a length dimension 56 (FIG. 6) and a width dimension 57 (FIG. 3) that is proportional in size to an average, real-life anatomical body part that it represents. In this case, the length 56 and width 57 of the anatomical representation 55 of a brain are proportionate to an average-sized human brain. The thickness dimension 58 (FIG. 5) is preferably disproportionately sized relative to its real-life counterpart so that the model 50 is suited to fit in one's pocket. To avoid being too bulky and unmanageable, the thickness dimension 58 is preferably no greater than approximately 35 mm and the length dimension 56 is preferably no greater than approximately 150 mm. Furthermore, the model should be constructed from materials that are lightweight such that the entire model weights preferably eight-to-sixteen ounces.

The thickness dimension 58 of the anatomical representation 55 is preferably greater than the thickness 74 of the flexible framework 60 as shown in FIG. 3, which provides the model 50 with depth and the ability to demonstrate the anatomical representation 55 in three dimensions. In the embodiment of FIGS. 1-6, the thickness 58 of the anatomical representation 55 extends outwardly from the front surface 62 and the rear surface 64 of the flexible framework 60 (see FIGS. 4-6). However, the thickness may only extend from one of the front surface 62 or rear surface 64 as the case may be.

As noted above, a portion or the entirety of the anatomical representation 55 may be removable relative to the flexible framework 60 as desired. If the entire anatomical representation 50 is removable, it may be provided in an interchangeable format, wherein the anatomical representation 55 is situated in a removable housing 80 (FIG. 1) that is replaceable with other housings on which other anatomical representations are situated. Thus, instead of transporting multiple flexible frameworks housing multiple anatomical representations, it may only be necessary to transport one flexible framework and a variety of anatomical representation inserts for demonstrating a variety of different anatomical body parts.

FIGS. 7-10 illustrate an alternative embodiment of an anatomical pocket model 100 in accordance with the present invention. For purposes of explanation, the model 100 is a three-dimensional representation of a stomach 105, it being understood that other anatomy, human or otherwise, may be represented as desired. The model 100 comprises a flexible framework 110 having a front 120, back 125, top 130, bottom 135, left side 140, right side 145 and thickness 150. Identifying indicia 160 (FIG. 7) may be provided on a portion of the flexible framework 110 and/or on a portion 162 (FIG. 8) of the anatomical representation 105 as discussed above.

Figure 7:
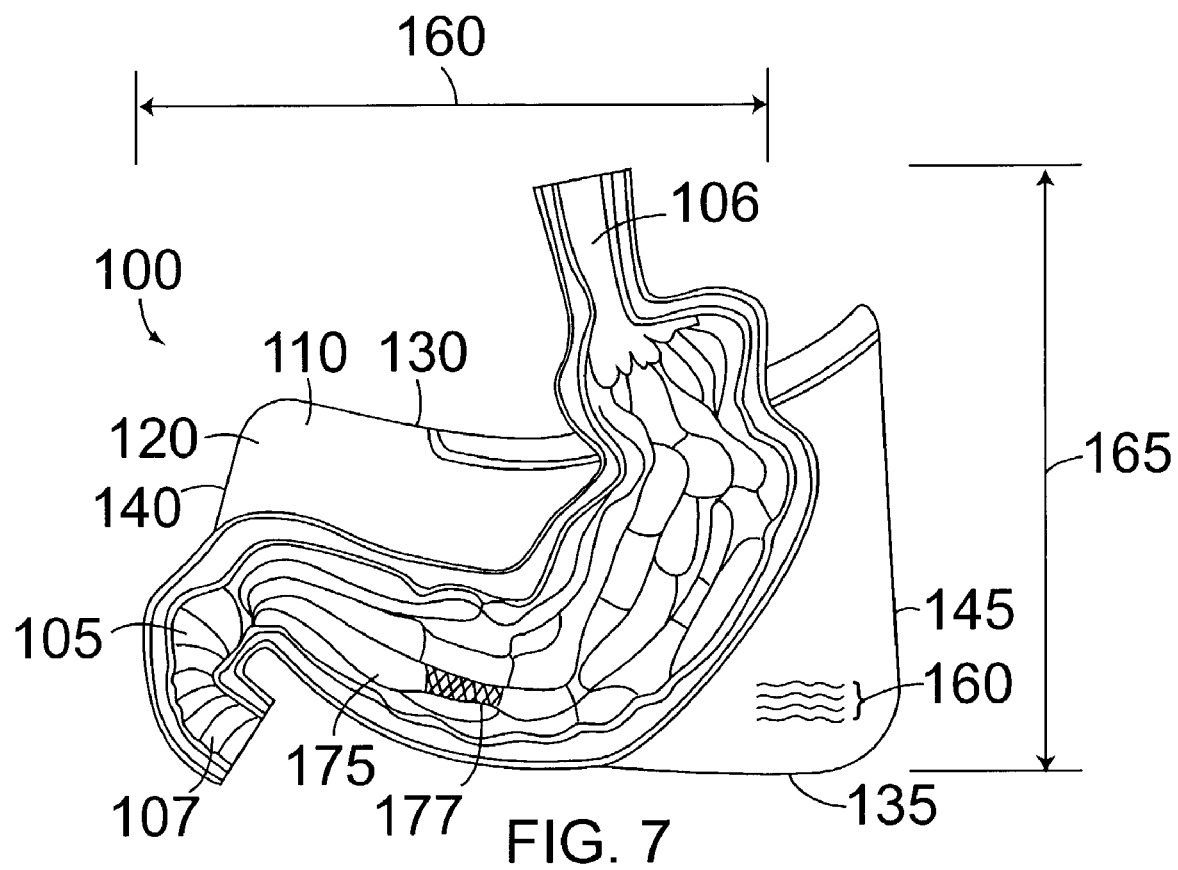
FIG. 7 is a front view of an alternative embodiment of an anatomical pocket model of the present invention.
Figure 8:
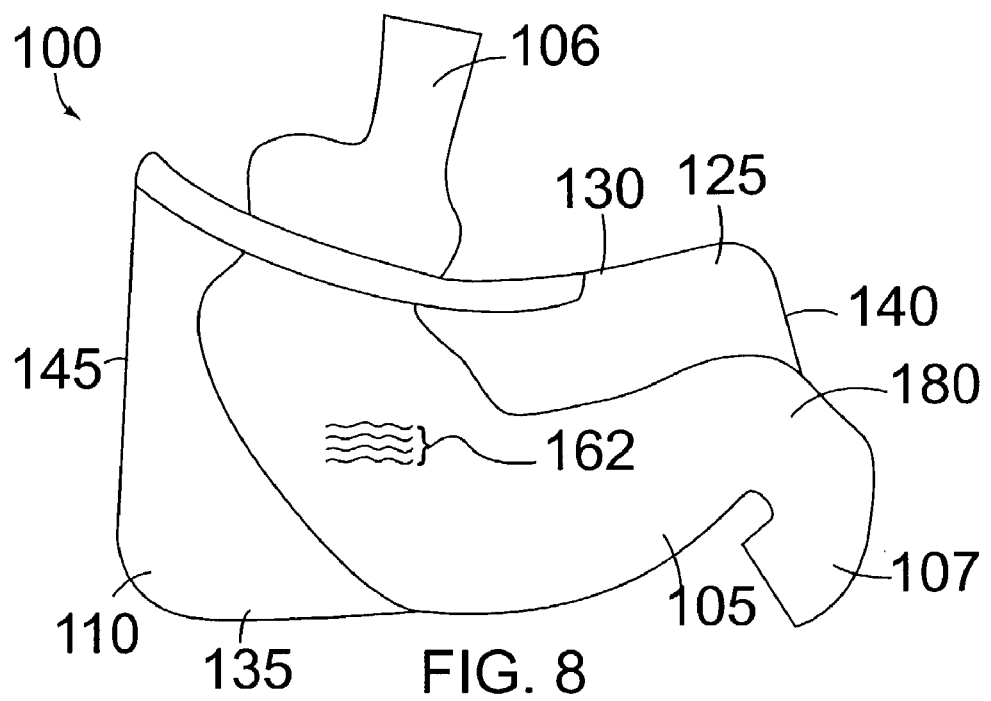
FIG. 8 is a back view of the model of FIG. 7.
Figure 9:
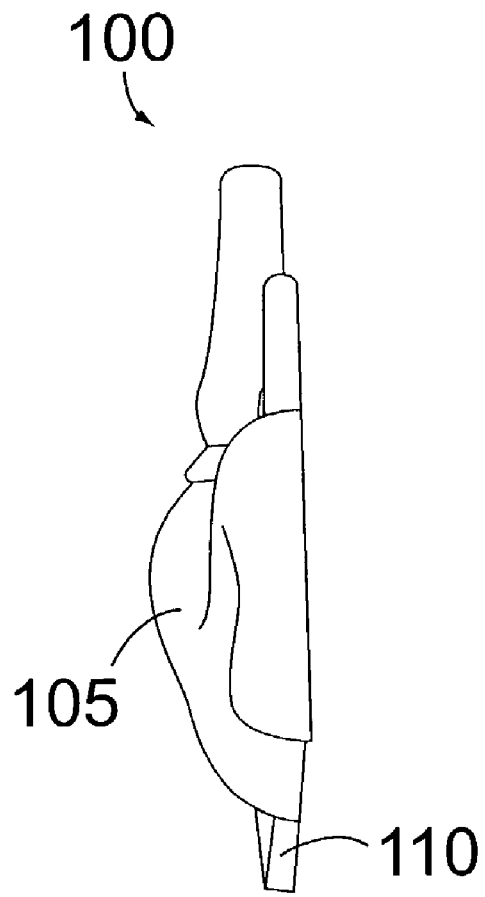
FIG. 9 is a left side view of the model of FIG. 7.
Figure 10:
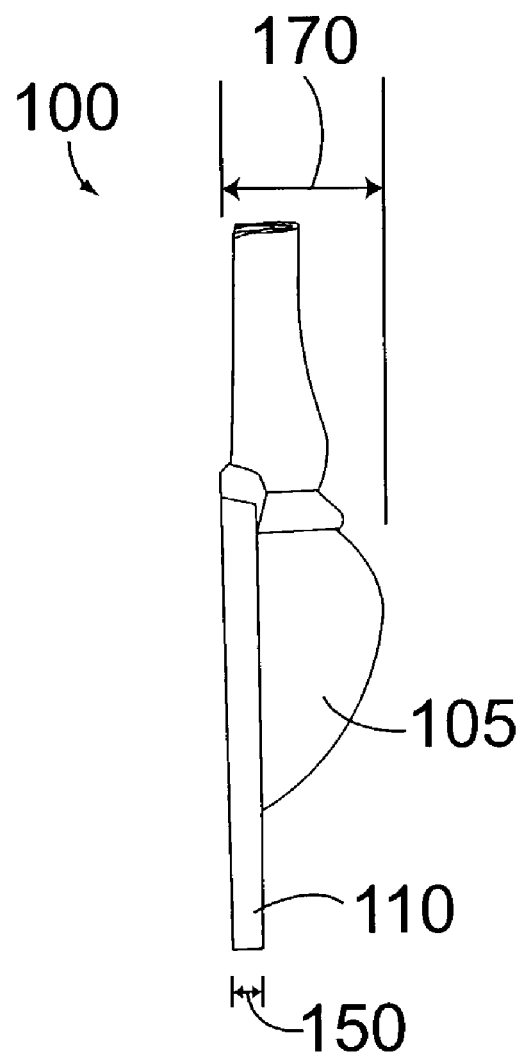
FIG. 10 is a right side view of the model of FIG. 7.

In the embodiment of FIGS. 7-10, the framework 110 is irregular and does not enclose the three-dimensional anatomical representation 105 on all sides 130, 135, 140 and 145. Instead, portions 106, 107 (FIGS. 7 and 8) of the anatomical representation 105 extend through the outer peripheral edge of the framework 110. In addition, the bottom edge 135 of the flexible framework 110 follows the contour of the bottom edge of the anatomical representation 105 as shown in FIGS. 7 and 8. Thus, the protruding parts 106, 107 of the anatomical representation 105 lend themselves to the natural shape of the anatomy which it represents, and enables the model 100 to realistically represent such anatomy with the most efficient use of space.

Similar to the embodiment of FIGS. 1-6, the three-dimensional anatomical representation 110 has a length dimension 160 (FIG. 7) and a width dimension 165 (FIG. 7) that is proportional in size to an average, real-life anatomical body part that it represents. In this case, the length 160 and width 165 of the anatomical representation 105 of a stomach are proportionate to an average-sized human stomach. The thickness dimension 170 (FIG. 10) is preferably disproportionately sized relative to its real-life counterpart so that the model 100 is suited to fit in one's pocket. In addition, the thickness 170 of the anatomical representation 105 is preferably greater than the thickness 150 of the flexible framework 105, which provides the model 100 with depth and the ability to demonstrate the anatomical representation 105 in three dimensions.

In the embodiment of FIGS. 7-10, the thickness 170 of the anatomical representation 105 extends outwardly from the rear surface 125 of the flexible framework 110. The front view of the model 100 shown in FIG. 7 illustrates a detailed depiction of the inner lining 175 of the stomach representation 105, while the rear view of the model 100 shown in FIG. 8 illustrates the outer surface or lining 180 of the stomach representation 105. Thus, the model 100 illustrates a cross-sectional view of an anatomical body part. To depict an abnormality in the stomach lining, such as a diseased pathology, an ulcer or an erosion of the lining for example, a portion 177 (FIG. 7) of the inner lining 175 may be removable from the anatomical representation 105.

As noted above, the anatomical representation 105 may be manufactured with, or separately from, the framework 110 using a variety of contemplated methods, and such representation 105 may be irremovable from the framework 110 or removable, partially or in its entirety, from such framework 110. Regardless of how the model 100 is manufactured, it should preferably be constructed from a flexible material that will not injure or cause great discomfort to the medical professional or patient if he or she should bump into or lean against a rigid surface while carrying the model 100 in his or her pocket.

While the present invention has been described at some length and with some particularity with respect to the several described embodiments, it is not intended that it should be limited to any such particulars or embodiments or any particular embodiment, but it is to be construed with references to the appended claims so as to provide the broadest possible interpretation of such claims in view of the prior art and, therefore, to effectively encompass the intended scope of the invention. Furthermore, the foregoing describes the invention in terms of embodiments foreseen by the inventor for which an enabling description was available, notwithstanding that insubstantial modifications of the invention, not presently foreseen, may nonetheless represent equivalents thereto.

I claim:

1. An anatomical pocket model for transporting in a lab pocket, the anatomical pocket model adapted for transporting in a user's pocket, the anatomical model comprising:
   a flexible, bendable, framework having a front, a back and a thickness; and
   a flexible, bendable three-dimensional representation of an anatomical body part positioned on said flexible framework and having a length, a width and a thickness;

wherein said width and length of said anatomical body part representation are proportional in size to a real life anatomical body part;

wherein said thickness of said anatomical body part representation is reduced disproportionately in size as compared with the width and length sizes and having a maximum thickness of 35 mm; and wherein said thickness of said anatomical body part representation is greater than said thickness of said flexible framework;

wherein one of the front and the back comprises an exterior view of the anatomical body part and the other of the front and the back comprises an interior view of the anatomical body part.

2. An anatomical pocket model adapted for transporting in a user's pocket, the anatomical model comprising:

a flexible, bendable, framework having a front, a back and a thickness; and a flexible, bendable three-dimensional representation of an anatomical body part positioned on said flexible framework and having a length, a width and a thickness, the representation having a reverse side and an obverse side, wherein one of the reverse and obverse side displays an exterior view of the body part and the other of the reverse and obverse displays an interior view of the body part;

wherein said width and length of said anatomical body part representation are proportional in size to a real life anatomical body part;

wherein said thickness of said anatomical body part representation is reduced disproportionately in size as compared with the width and length sizes and having a maximum thickness of 35 mm, wherein said thickness of said anatomical body part representation is greater than said thickness of said flexible framework; and wherein the reverse and obverse sides are readily accessible to the user at the same time.

3. An anatomical pocket model in accordance with claim 2, wherein said thickness of said anatomical body part representation extends outwardly from at least one of said front and said back of said flexible framework.

4. An anatomical pocket model in accordance with claim 2, wherein said flexible framework further comprises a top and a bottom and wherein said anatomical body part representation extends outwardly from at least one of said top and said bottom of said flexible framework.

5. An anatomical pocket model in accordance with claim 2, wherein said thickness of said anatomical body part representation extends outwardly from said front and said back of said flexible framework.

6. An anatomical pocket model in accordance with claim 2, wherein said flexible framework further comprises a top and a bottom and wherein said anatomical body part representation extends outwardly from said top and said bottom of said flexible framework.

7. An anatomical pocket model in accordance with claim 2, wherein said anatomical body part representation is a cross-section of an anatomical body part having an interior and an exterior, said interior being viewable from one of said front and said back of said flexible framework and said exterior being viewable from the other of said front and said back of said flexible framework.

8. An anatomical pocket model in accordance with claim 2, wherein said flexible framework has an outer edge periphery, a portion of which is defined by the anatomical body part representation, such that the flexible framework does not completely enclose the length and width of the anatomical body part representation.

9. An anatomical pocket model in accordance with claim 2, wherein said flexible framework is rectangular.

10. An anatomical pocket model in accordance with claim 2, wherein said flexible framework has an irregular shape.

11. An anatomical pocket model in accordance with claim 2, wherein said flexible framework has an irregular shape, part of which follows the shape of the anatomical body part representation.

12. An anatomical pocket model in accordance with claim 2, wherein said anatomical body part representation further comprises a removable diseased pathology.

13. An anatomical pocket model in accordance with claim 2, wherein said anatomical body part representation is not removable from said flexible framework.

14. An anatomical pocket model in accordance with claim 2, wherein said anatomical body part representation is removable from said flexible framework.

15. An anatomical pocket model in accordance with claim 14, further comprising a plurality of anatomical body part representations that are interchangeable relative to said flexible framework.

16. An anatomical pocket model in accordance with claim 2, wherein only a portion of said anatomical body part representation is removable from said flexible framework.

17. An anatomical pocket model in accordance with claim 2, further comprising identifying indicia imprinted on one of said flexible framework and said anatomical body part representation that is descriptive of said anatomical body part representation.

18. An anatomical pocket model in accordance with claim 2, wherein said length of said anatomical body part representation is not greater than 150 mm.

19. An anatomical pocket model in accordance with claim 4, wherein said anatomical body part representation is a cross-section of an anatomical body part having an interior and an exterior, said interior being viewable from one of said front and said back of said flexible framework and said exterior being viewable from the other of said front and said back of said flexible framework.

20. An anatomical pocket model in accordance with claim 19, wherein said flexible framework has an irregular shape, part of which follows the shape of the anatomical body part representation.

21. An anatomical pocket model in accordance with claim 20, wherein a portion of said anatomical body part representation is removable from said flexible framework.

* * * * *